(12) United States Patent
Chen et al.

(10) Patent No.: US 8,649,337 B2
(45) Date of Patent: Feb. 11, 2014

(54) CONTROL CHANNEL DESIGN FOR DYNAMIC SUB-FRAME SELECTION

(75) Inventors: Wanshi Chen, San Diego, CA (US); Juan Montojo, San Diego, CA (US); Aamod D. Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 426 days.

(21) Appl. No.: 12/816,078

(22) Filed: Jun. 15, 2010

(65) Prior Publication Data

US 2010/0322154 A1 Dec. 23, 2010

Related U.S. Application Data

(60) Provisional application No. 61/218,827, filed on Jun. 19, 2009.

(51) Int. Cl.
*H04W 4/00* (2009.01)

(52) U.S. Cl.
USPC .......................................... 370/329; 370/328

(58) Field of Classification Search
USPC ......... 370/208, 203, 280, 329, 328, 330, 311, 370/312, 252, 310; 455/422.1, 456.1, 455/550.1, 561, 101, 418; 375/267
See application file for complete search history.

(56) References Cited

U.S. PATENT DOCUMENTS

| | | |
|---|---|---|
| 2007/0019605 A1 | 1/2007 | Rioux et al. |
| 2007/0064669 A1 | 3/2007 | Classon et al. |
| 2008/0049690 A1 | 2/2008 | Kuchibhotla et al. |
| 2008/0268878 A1* | 10/2008 | Wang et al. .................. 455/458 |
| 2009/0042616 A1 | 2/2009 | Teo et al. |
| 2009/0156225 A1 | 6/2009 | Angelow et al. |
| 2009/0168683 A1 | 7/2009 | Franceschini et al. |
| 2009/0247201 A1 | 10/2009 | Ye et al. |
| 2010/0046412 A1* | 2/2010 | Varadarajan et al. ......... 370/312 |

(Continued)

FOREIGN PATENT DOCUMENTS

| | | |
|---|---|---|
| JP | 2008535392 A | 8/2008 |
| WO | WO2006105005 | 10/2006 |
| WO | 2008135851 A1 | 11/2008 |

OTHER PUBLICATIONS

ZTE: "General control channel design for LTE-A" 3GPP Draft; RI-083609 General Control Channel Design for LTE-A, 3rd Generation Partnership Project (3GPP), Mobile Competence Centre; 650, Route Des Lucioles; F-06921 Sophia-Antipolis Cedex; France, No. Prague, Czech Republic; Sep. 24, 2008, XP050316969 [retrieved on 2008.*

(Continued)

*Primary Examiner* — Abdullah Riyami
(74) *Attorney, Agent, or Firm* — Kam T. Tam

(57) ABSTRACT

Certain aspects of the disclosure relate to providing detailed control channel design for a dynamic selection scheme between normal subframes and special subframes. In one aspect, a method may be provided for generating a subframe that comprises a data region and at least one control region interpretable by a first group of one or more legacy User Equipments (UEs) as a first type and by a second group of non-legacy UEs as a second type, wherein the second group of UEs supports a plurality of features that are a superset of a plurality of features supported by the first group and transmitting the subframe to the first group and the second group of UEs.

40 Claims, 5 Drawing Sheets

(56) References Cited

U.S. PATENT DOCUMENTS

| | | | |
|---|---|---|---|
| 2010/0061345 A1 | 3/2010 | Wengerter et al. | |
| 2010/0080152 A1 | 4/2010 | Lindh et al. | |
| 2010/0097978 A1 | 4/2010 | Palanki et al. | |
| 2010/0167726 A1 | 7/2010 | Schwalb | |
| 2010/0195583 A1 | 8/2010 | Nory et al. | |
| 2010/0208660 A1 | 8/2010 | Ji | |
| 2010/0232346 A1 | 9/2010 | Yu et al. | |
| 2010/0273506 A1* | 10/2010 | Stern-Berkowitz et al. | 455/456.1 |
| 2010/0279634 A1 | 11/2010 | Sagfors et al. | |
| 2010/0303013 A1* | 12/2010 | Khandekar et al. | 370/328 |
| 2011/0013554 A1 | 1/2011 | Koskinen | |
| 2011/0064159 A1* | 3/2011 | Ko et al. | 375/267 |
| 2011/0243090 A1* | 10/2011 | Grovlen et al. | 370/329 |
| 2011/0275363 A1* | 11/2011 | Kwon et al. | 455/422.1 |
| 2011/0317641 A1* | 12/2011 | Noh et al. | 370/329 |
| 2012/0020323 A1* | 1/2012 | Noh et al. | 370/330 |
| 2012/0044851 A1* | 2/2012 | Wang et al. | 370/312 |
| 2012/0093051 A1* | 4/2012 | Xu | 370/311 |
| 2012/0155338 A1* | 6/2012 | Noh et al. | 370/280 |
| 2012/0163335 A1* | 6/2012 | Chung et al. | 370/330 |

OTHER PUBLICATIONS

3rd Generation Partnership Project; Technical Specification Group Radio Access Network; Evolved Universal Terrestrial Radio Access (E-UTRA); User Equipment (UE) procedures in idle mode (3GPP TS 36.304, V 8.6.0 Release 8), Jun. 1, 2009, XP050377598.*

3rd Generation Partnership Project;Technical Specification Group Radio Access Network; Evolved Universal Terrestrial Radio Access (E-UTRA); User Equipment (UE) procedures in idle mode (Release 8) 3GPP Standard; 3GPP TS 36.304, 3rd Generation Partnership Project (3GPP), Mobile Competence Centre ; 650, Route Des Lucioles ; F-06921 Sophia-Antipolis Cedex ; France, No. V8.6.0, r Jun. 1, 2009, pp. 1-30, XP050377598 paragraph 7.1, lines 1-4; p. 26.

Fujitsu: "DL eNodeB sub-frame for DL backhaul" 3GPP Draft; R1-091965, 3rd Generation Partnership Project (3GPP), Mobile Competence Centre ; 650, Route Des Lucioles ; F-06921 Sophia-Antipolis Cedex ; France, No. San Francisco-, USA; Apr. 28, 2009.

International Search Report and Written Opinion—PCT/US2010/039252, International Search Authority—European Patent Office—Oct. 12, 2010.

LG Electronics: "Downlink Reference Signal for Higher Order MIMO" 3GPP Draft; R1-090218_LGE_DL-RS, 3rd Generation Partnership Project (3GPP), Mobile Competence Centre ; 650, Route Des Lucioles ; F-06921 Sophia-Antipolis Cedex ; France, No. Ljubljana; Jan. 8, 2009, XP050318148 [retrieved on Jan. 8, 2009] p. 3, line 28-line 33.

LG Electronics: "Issues on DL-RS Design for LTE-A" 3GPP Draft; RI-090787, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318644 [retrieved on Feb. 3, 2009] p. 1, line 7-line 9 p. 2, line 5-line 19 p. 3, line 6-line 16 p. 3, line 29-line 36.

LTE; Evolved Universal Terrestrial Radio Access (E-UTRA); Physical channels and modulation (3GPP TS 36.211 version 8.7.0 Release 8) Technical Specification, European Telecommunications Standards Institute (ETSI), 650, Route Des Lucioles ; F-06921 Sophia-Antipolis ; France, No. V8.7.0, Jun. 1, 2009, XP014044748.

Nokia Siemens Networks et al: "Control Channel for Relay Backhaul link" 3GPP Draft; R1-091763_Control Relays Backhaul, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339287 [retrieved on Apr. 28, 2009] p. 1, 1line 4-1line 7 p. 1, line 9-line 30 p. 2, line 4-line 12 main figure; p. 2 p. 3, line 24-line 29.

Qualcomm Europe: "Extension Carriers for LTE-A" 3GPP Draft; RI-094203 Extension Carriers for LTE-A, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050388673 [retrieved on Oct. 6, 2009] the whole document.

Qualcomm Europe: "Notions of segment and non-backward compatible carriers for LTE-A" 3GPP Draft; RI-093119 MC Notions, 3rd Generation Partnership Project (3GPP), Mobile Competence Centre ; 650, Route Des Lucioles ; F-06921 Sophia-Antipolis Cedex ; France, No. Shenzhen, China; Aug. 19, 2009, XP050351490 [retrieved on Aug. 19, 2009] the whole document.

Texas Instruments: "Refinement on, Downlink Reference Signal Design", 3GPP Draft; RI-091291 TI DLRS, 3rd , Generation Partnership Project (3GPP), Mobile Competence Centre ; 650, Route Des Lucioles ; F-06921 Sophia-Antipolis Cedex ; France, No. Seoul, Korea; Mar. 18, 2009, XP050338898 [retrieved on Mar. 18, 2009] section 1 section 2 section 5 figures 1,2 p. 3, line 29-line 35 appendix; p. 6.

ZTE: "General control channel design for LTE-A" 3GPP Draft; RI-083609 General Control Channel Design for LTE-A, 3rd Generation Partnership Project (3GPP), Mobile Competence Centre ; 650, Route Des Lucioles ; F-06921 Sophia-Antipolis Cedex ; France, No. Prague, Czech Republic; Sep. 24, 2008, XP050316969 [retrieved on Sep. 24, 2008] p. 1, line 4-line 9 p. 1; figure 2.1.

3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre; 650, Route des Lucioles; F-06921 SOPHIA-Antipolis Cedex; France, No. V8.6.0, Mar. 1, 2009, pp. 1-83, XP050377538.

Ericsson: "Efficient support of relays through MBSFN subframes" 3GPP Draft; R1-084357, 3RD Generation Partnership Project (3GPP), Mobile Competence Centre; 650, Route des Lucioles; F-06921 Sophia-Antipolis Cedex; France, No. Prague, Czech Republic; Nov. 4, 2008, XP050317627 [retrieved on Nov. 4, 2008 ].

Fujitsu: "Subframe configuration for supporting high order DL MIMO", 3GPP TSG-RAN1 #56Bis, R1-091507, Mar. 27, 2009.

QUALCOMM Europe; "Support of Rel-8 UEs by LTE-A Relays", 3GPP RAN WG1#54bis, R1-084054; Oct. 3, 2008.

3GPP: "LTE; Evolved Universal Terrestrial Radio Access (E-UTRA); User Equipment (UE) procedures in idle mode (3GPP TS 36.304 version 8.5.0 Release 8)" ETSI TS 136 304 V8.5.0, Apr. 30, 2009, pp. 31.

Taiwan Search Report—TW099120139—TIPO—Jul. 26, 2013.

* cited by examiner

US 8,649,337 B2

CONTROL CHANNEL DESIGN FOR DYNAMIC SUB-FRAME SELECTION

CLAIM OF PRIORITY UNDER 35 U.S.C. §119

The present Application for Patent claims benefit of Provisional Application Ser. No. 61/218,827, filed Jun. 19, 2009, and assigned to the assignee hereof and hereby expressly incorporated by reference herein.

BACKGROUND

1. Field

Certain aspects of the disclosure generally relate to wireless communications and, more particularly, to a method for communication of feedback information in advanced wireless communication systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects provide a method for wireless communications. The method generally includes generating a subframe that comprises a data region and at least one control region interpretable by a first group of one or more legacy User Equipments (UEs) as a first type and by a second group of non-legacy UEs as a second type, wherein the second group of UEs supports a plurality of features that are a superset of a plurality of features supported by the first group, and transmitting the subframe to the first group and the second group of UEs.

Certain aspects provide an apparatus for wireless communication. The apparatus generally includes means for generating a subframe that comprises a data region and at least one control region interpretable by a first group of one or more legacy User Equipments (UEs) as a first type and by a second group of non-legacy UEs as a second type, wherein the second group of UEs supports a plurality of features that are a superset of a plurality of features supported by the first group, and means for transmitting the subframe to the first group and the second group of UEs.

Certain aspects provide for an apparatus for wireless communications comprising at least one processor and a memory coupled to the at least one processor. The processor is generally configured to generate a subframe that comprises a data region and at least one control region interpretable by a first group of one or more legacy User Equipments (UEs) as a first type and by a second group of non-legacy UEs as a second type, wherein the second group of UEs supports a plurality of features that are a superset of a plurality of features supported by the first group, and transmit the subframe to the first group and the second group of UEs.

Certain aspects provide for a computer-program product for wireless communications comprising a computer-readable medium. The computer-readable medium generally comprises code for generating a subframe that comprises a data region and at least one control region interpretable by a first group of one or more legacy User Equipments (UEs) as a first type and by a second group of non-legacy UEs as a second type, wherein the second group of UEs supports a plurality of features that are a superset of a plurality of features supported by the first group, and transmitting the subframe to the first group and the second group of UEs.

DETAILED DESCRIPTION

Figure 1:
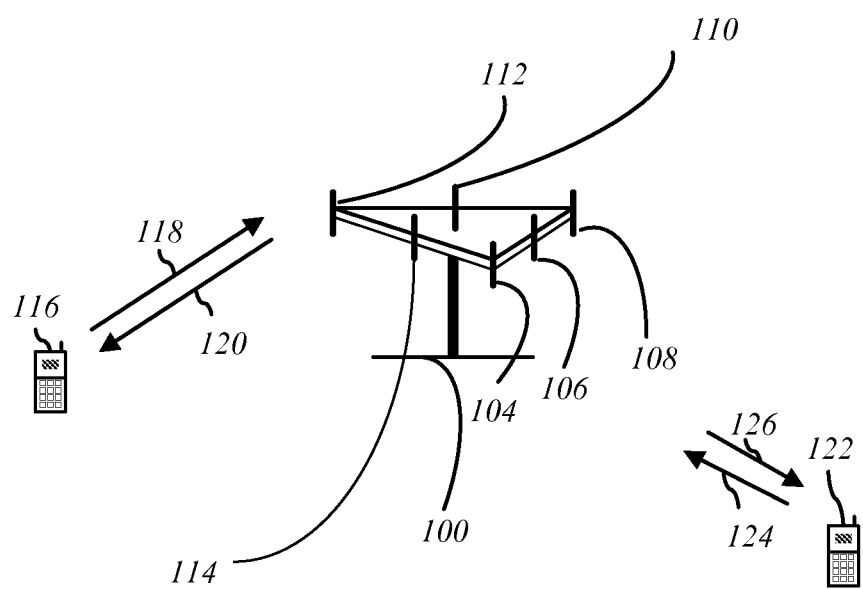
FIG. 1 illustrates an example multiple access wireless communication system in accordance with certain aspects of the disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), evolved Node B ("eNodeB" or "eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
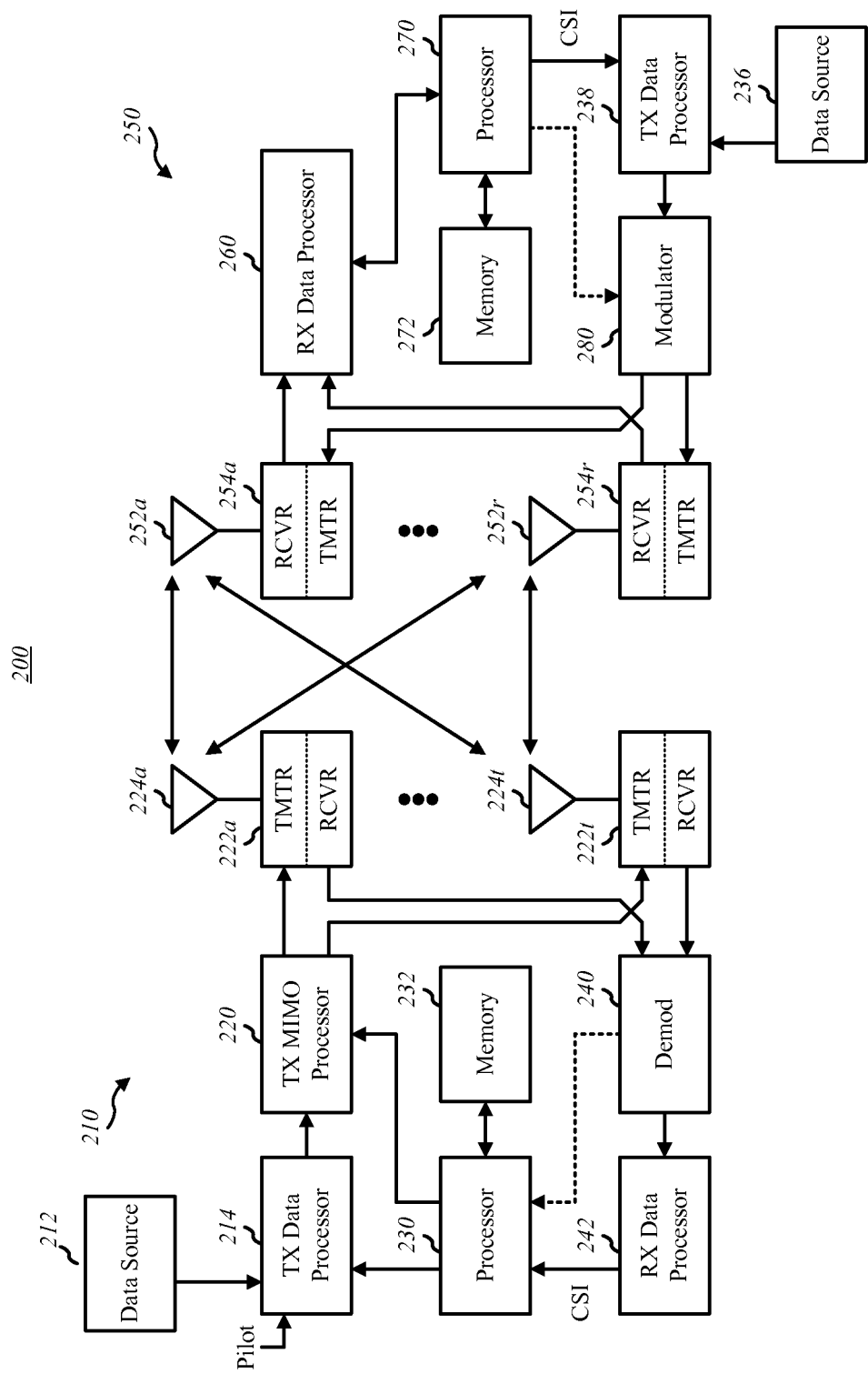
FIG. 2 illustrates a block diagram of an access point and a user terminal in accordance with certain aspects of the disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

A RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
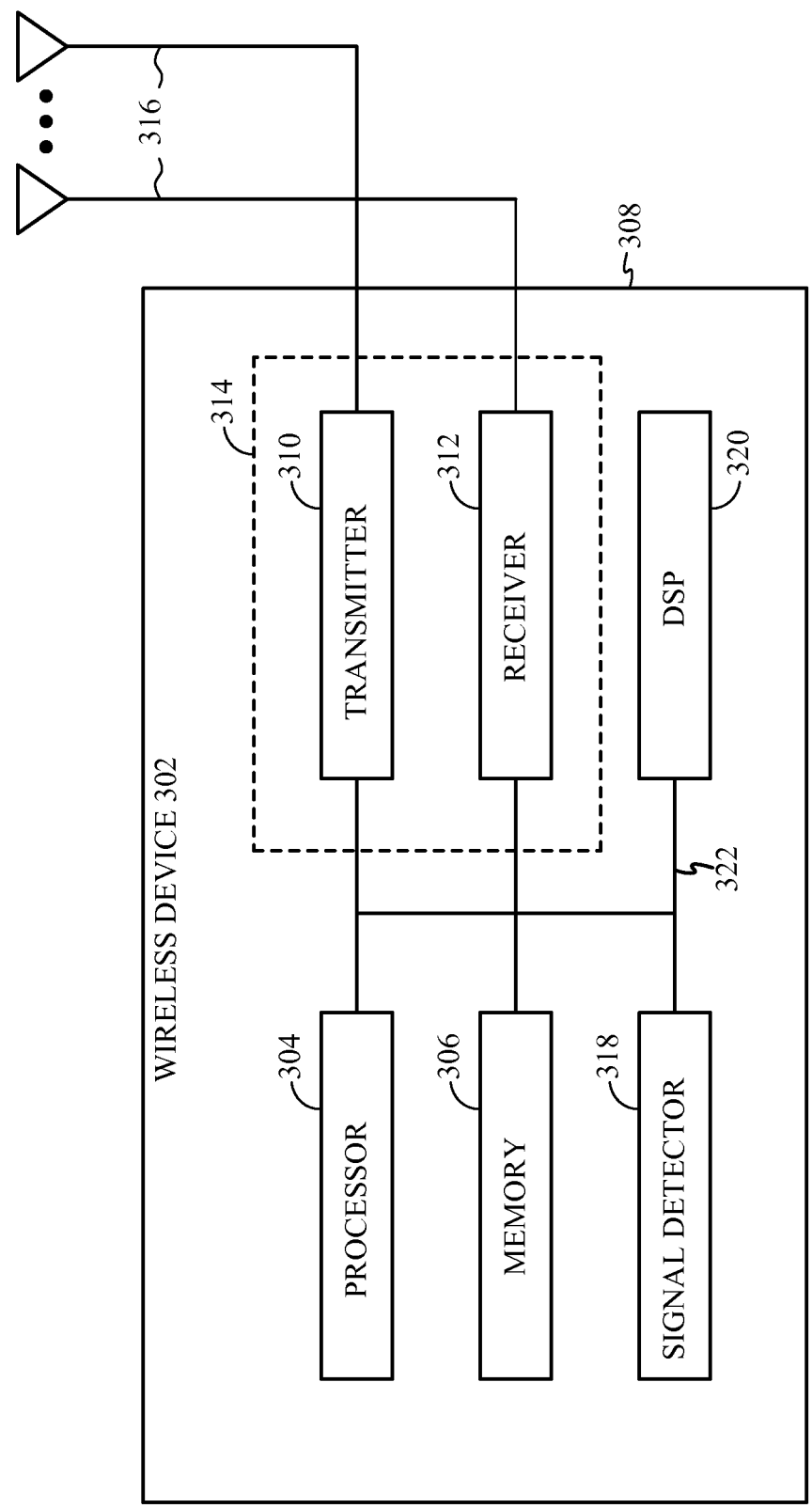
FIG. 3 illustrates various components that may be utilized in a wireless device in accordance with certain aspects of the disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and uplink (UL) channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Control Channel Design for Dynamic Selection Between Normal and Special Subframes According to certain aspects, dynamic selection between normal subframes and special subframes may be provided, which may result in increased support for future features in LTE Release-8 and beyond. Special subframes may include Multimedia Broadcast Single Frequency Network (MBSFN) subframes, subframes defined by the LTE Release-8 standard, and blank subframes, subframes in which the UE expects no transmission at all from the eNB.

MBSFN subframes are used to support Single Frequency Network (SFN) broadcast transmissions. They may also be thought of as a general forward-compatibility mechanism. In MBSFN subframes, a Release-8-compatible UE expects transmissions on the first one or two OFDM symbols of the subframe, in the case of a two transmit antenna or four transmit antenna eNB, respectively. The remaining OFDM symbols may therefore be used to define features for UEs conforming to later releases and may be ignored by UEs compatible with LTE Release-8-only, or "legacy UEs".

However, LTE legacy mandates that at most six out of a total of ten subframes in a radio frame may be designated as MBSFN subframes. The remaining subframes may be used by a legacy UE for measurement purposes or for paging UEs. In particular, a UE may be configured to receive paging in the following "reserved" subframes:

For frequency division duplex (FDD): {9}, {4, 9}, or {0, 4, 5, 9}

For time division duplex (TDD): {0}, {0, 5}, or {0, 1, 5, 6}

One consequence with using MBSFN or blank subframes is that there may be some impact to legacy UEs if an eNB designates one of subframes 0, 4, 5 and 9 as MBSFN or blank subframes, which an eNB may do to allocate more bandwidth to new network features. Such consequences include increased measurement inaccuracy and missed pages.

To improve use of future, or non-legacy, features, an eNB may configure one or more of the "reserved" subframes (again 0, 4, 5 and 9 in FDD and 0, 1, 5 and 6 in TDD) as MBSFN/blank subframes for UEs conforming to newer releases. (It is noted that legacy UEs may always consider these subframes to be regular subframes.) However, if a legacy UE receives a page on this reserved subframe, the eNB may then dynamically reconfigure this subframe as a regular LTE legacy subframe and send the page on this subframe. As such, no pages may be missed by legacy UEs. If no legacy UE receives a page on this subframe, the eNB may not transmit the common reference signal (CRS) in the data portion of the subframe (i.e., the data portion appears to be blanked.) It is noted that the reconfiguration is performed from the perspective of a new UE; the legacy-only UE may consider this subframe to be a regular legacy subframe. In the following disclosure, these subframes may be deemed "mixed" subframes.

UEs which support LTE Release-8 and future standards, or "non-legacy" UEs, may be aware that the eNB may dynamically carry out such a reconfiguration and therefore may not suffer degradation in performance due to the reconfiguration. In other cases, the MBSFN or blank subframe may be used to reduce interference in other cells, and UEs in those cells may suffer some interference due to the dynamic reconfiguration as a regular legacy subframe. However, this interference may be an acceptable price to pay for reducing the missed page rate for legacy UEs.

It is further noted that the reconfiguration may not be explicitly communicated to any terminal via uni-cast (e.g., RRC signaling) or broadcast (e.g., System Information Block) signaling. Rather, the reconfiguration may be an instantaneous scheduler decision so that the legacy UE can demodulate the page. Non-legacy UEs conforming to newer releases would be aware that such a change could occur at any time.

An eNB may also dynamically switch between MBSFN subframes (known by legacy UEs) and blank subframes (unknown format for legacy UEs; therefore potentially causing some degradation) based on the level of activity of legacy UEs. In one example, if a network determines that there are few legacy UEs present in a cell (e.g., based on the paging activity of legacy UEs), the network may begin using blank subframes instead of MBSFN subframes for all subframes except 0 and 5. Subframes 0 or 5 may still be configured as regular subframes so that the measurement accuracy of legacy UEs will not see excessive degradation. In other instances, the eNB may configure some subframes as MBSFN subframes (so that the reference symbols in these subframes are available for measurements) and other subframes as blank subframes.

It is noted that for regular data operation, an eNB may prioritize scheduling of legacy UEs on non-MBSFN (i.e. "regular") subframes; so that the MBSFN or blank subframes may be used to schedule new UEs (with potentially new features or waveforms).

For LTE legacy, Physical Hybrid ARQ Indicator Channel (PHICH) resource size (2-bit, denoted by Ng) and PHICH duration (1-bit) may be transmitted on the Master Information Block (MIB) and may be configured semi-statically. In particular, PHICH resource size may be at least the same within a frame, while PHICH duration depends on L3 configuration, on MBSFN vs. non-MBSFN subframes, and TDD or FDD. In a FDD system, it is defined that if normal PHICH duration is configured by L3, PHICH may be contained within the first symbol. When PHICH duration is extended, for MBSFN subframes, PHICH spans two symbols; while for non-MBSFN, PHICH spans three symbols.

It is also acknowledged that paging may use regular Physical Downlink Control Channel (PDCCH) in the common search space with possible aggregation levels of 4 and 8 Control Channel Elements (CCEs) (one CCE is 36 Resource Elements, or "REs"). This translates to 4*36=144 or 8*36=288 REs. Consider one exemplary system having two transmit antennas, normal Cyclic Prefix (CP), and a 5 MHz system. In such a system, there are 300 REs per symbols, among which 100 REs may be used for pilots, 16 REs for Physical Control Format Indicator Channel (PCFICH). The number of REs for PHICH may be computed as ceiling function of $(Ng (N_{RB}^{DL}/8))*12$, where Ng is the broadcasted resource size indicator and may take values of {⅙, ½, 1, 2}, and $N_{RB}^{DL}$ is the total number of RBs in the DL. For 5 MHz, $N_{RB}^{DL}=25$.

In this example, the minimum of REs for PHICH is thus ceiling(25/8/6)*12=12. The remaining REs for PDCCH is thus 300−100−16−12=172 REs, which may be only enough to support level 4 (4 CCEs) for paging PDCCH. Level 8 cannot be supported with one control symbol. The maximum of REs for PHICH is ceiling(25/8*2)*12=84. The remaining REs for PDCCH is thus 300−100−16−84=100 REs, which may not be enough to support level 4 (4 CCEs) for paging PDCCH. It is acknowledged that for systems with larger bandwidth, the above discussed issue may become less severe, as one symbol may contain more REs.

In one aspect, a control region for a "mixed" subframe is provided. The mixed subframe may include a control region that is decodable by "legacy" UEs that support a certain version of a standard and "non-legacy" UEs that support later versions of the standard. As an example, UEs that support LTE Release-8 may be considered legacy UEs, while UEs that support LTE Release-9 (and/or later Releases) may be considered non-legacy UEs.

In one aspect, PCFICH may be carefully designed to indicate the number of symbols for control to legacy UEs or non-legacy or later UEs. In another aspect, PHICH size may be such that PHICH may address the UL transmission in regular subframes and may also reduce impact on the PDCCH resource availability. For legacy UEs, the control region in mixed subframes may be treated the same as in normal subframes. For non-legacy UEs, a method is provided for interpreting the control region of "mixed" subframes.

Aspects are provided where legacy paging may or may not be found in the mixed subframes. In one aspect, a normal control region may be configured such that PCFICH and PHICH interpretation may be interpreted by non-legacy UEs as the same as in normal subframes. This may allow a mixture of legacy and non-legacy UEs in the same subframe, when there may be a paging for legacy UEs.

In another aspect, an MBSFN control region may be configured such that PCFICH and PHICH interpretation should be interpreted by non-legacy UEs as the same as in MBSFN subframes. From a perspective of an eNB, an eNB may transmit PCFICH and PHICH such that the combination is meaningful to both legacy and non-legacy UE.

Figure 4:
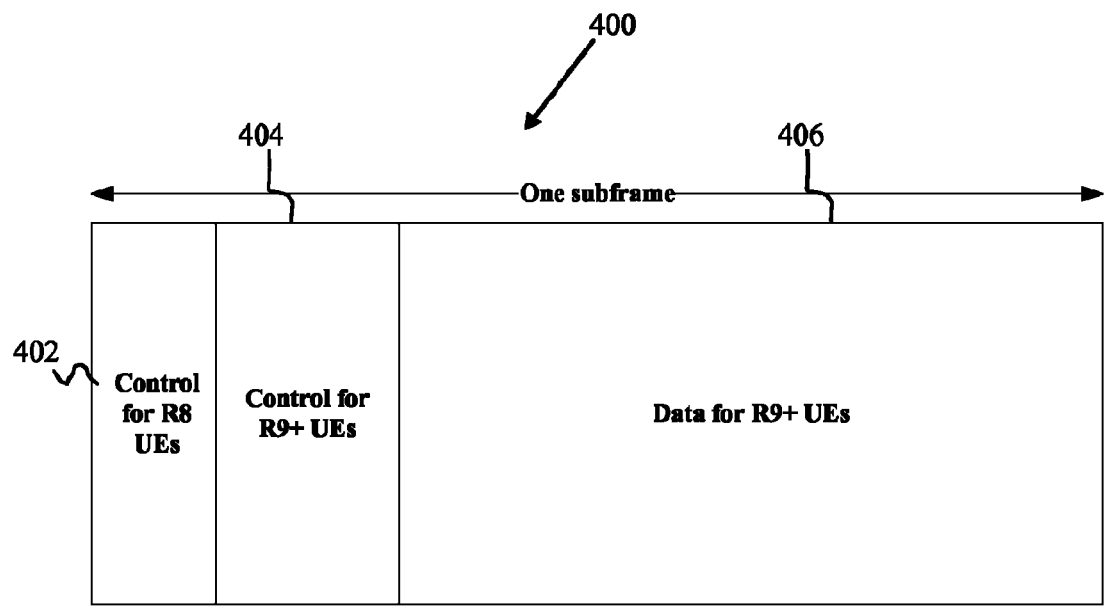
FIG. 4 illustrates an exemplary downlink transmission in accordance with certain aspects of the disclosure.

In one aspect, at least two separate control regions for legacy and non-legacy UEs may be configured in a mixed subframe, as illustrated in FIG. 4. A mixed subframe 400 may include a first control region 402, a second control region 404, and a data region 406. The first control region 402 may be configured for legacy UEs. In one aspect, an eNB may choose to have one control symbol for legacy backward compatibility. The second control region 404 may be configured for non-legacy UEs. In one aspect, time domain multiplexing (TDM) control for non-legacy UEs may be employed. In one aspect, a control region may be configured such that the number of control symbols for backwards compatibility with legacy UEs may be hard coded or set to one. As such, PHICH duration over all subframes in one frame for legacy UEs may always be one.

Aspects where there is at least one legacy paging indicator in a mixed subframe may utilize a normal control region, a MBSFN control region, or two separate control regions as described above. A control region may also be configured to configure the number of control symbols at more than one, in order to support paging PDCCH, as discussed above. Due to limitations of PHICH duration and PHICH size in MIB, a normal control region may be employed, the normal control region for both Release-8 and Release-9+UEs configured such that the region may be interpreted the same as in the normal subframes, while a data region is interpreted differently for Release-8 and Release-9+UEs. In one aspect, legacy UEs may be supported by a subframe comprising a legacy normal control region and a legacy normal data region, although it is acknowledged that the data region may be shut off to legacy UEs. Non-legacy UEs may be supported by a subframe comprising a legacy normal control region and a legacy MBSFN data region.

Figure 5:
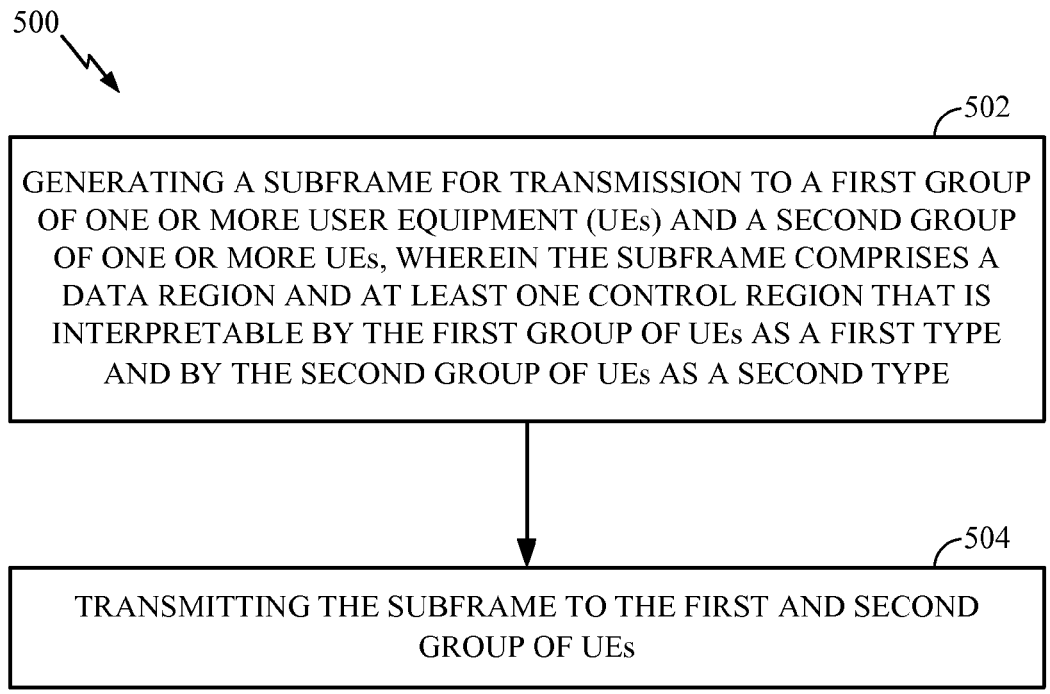
FIG. 5 illustrates an example operation that may be performed by an access point in accordance with certain aspects of the disclosure.

FIG. 5 illustrates exemplary operations 500 that may be performed by an eNB in accordance with aspects of the disclosure. At 502, the eNB may generate a subframe for transmission to a first group of one or more User Equipment (UEs) and a second group of one or more UEs. The second group of UEs may support a plurality of features that are a superset of a plurality of features supported by the first group of UEs. In one aspect, the first group of UEs may be Release-8 compliant legacy UEs and the second group of UEs may be Release-9+ non-legacy UEs. In one aspect, the generated subframe comprises at least one control region that may be interpreted by the first group of UEs as a first type and by the second group of UEs as a second type. At 504, the eNB may transmit the subframe to the first group and the second group of UEs.

It is acknowledged that with respect to system and networks elements described herein, language such as "legacy", "Rel-8-compatible-only", "R8", "older", and similar words may be used with respect to network elements, such as UEs, that support the LTE Release-8 standard but may not support further standards such as LTE Release-9. It is further acknowledged that language such as "non-legacy", "R9", "R9+", "Rel-9", "Rel-9+", or "newer", and similar words may be used with respect to network elements UEs that support at least LTE Release-9 and later releases. Non-legacy UEs may also be backwards-compatible with LTE Release-8.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of items refers to any combination of those items, including single members. As an example, "at least one of: a, b, or c" is intended to cover: a, b, c, a-b, a-c, b-c, and a-b-c.

Figure 5A:
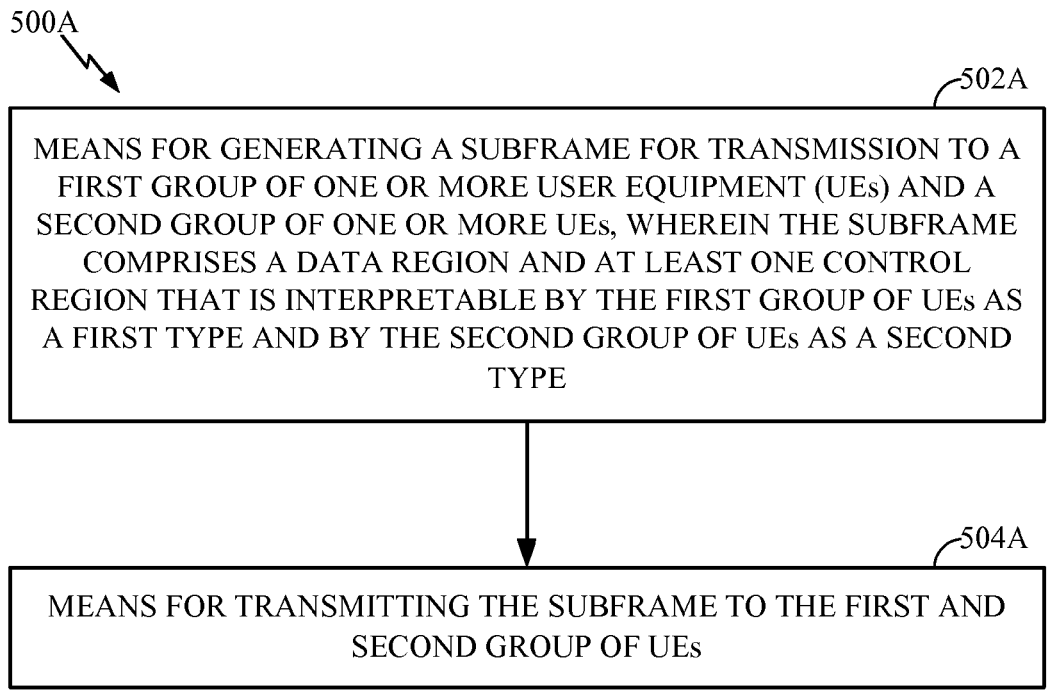
FIG. 5A illustrates example components capable of performing operations shown in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-504 illustrated in FIG. 5 correspond to means-plus-function blocks 502A-504A illustrated in FIG. 5A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the disclosure, other and further aspects of the disclosure may be devised without departing from the basic scope thereof, and the scope thereof is determined by the claims that follow.

The invention claimed is:

1. A method for wireless communications, comprising:
dynamically configuring one or more subframes, of a radio frame, reserved for paging a first group of one or more legacy user equipments as a special subframe in which transmission of reference signals are limited in a data portion of the special subframe, for at least some radio frames;
detecting a page for one of the first group of legacy user equipments to be transmitted in the dynamically configured subframe;
generating the dynamically configured subframe with a data region and at least one control region interpretable by the first group of one or more legacy user equipments and by a second group of non-legacy user equipments as a second type, wherein the second group of user equipments supports a plurality of features that are a superset of a plurality of features supported by the first group; and
transmitting the subframe to the first group and the second group of user equipments.

2. The method of claim 1, wherein the at least one control region comprises a physical control format indicator channel, a physical hybrid automatic repeat request indicator channel, and a physical control channel.

3. The method of claim 1, wherein the control region is interpretable by the first group of user equipments the same as by the second group of user equipments.

4. The method of claim 3, wherein the control region is interpretable as a normal control region when the subframe does not comprise any paging indicators for the first group of user equipments.

5. The method of claim 1, wherein the control region is interpretable by the first group of user equipments differently from that by the second group of user equipments when the subframe does not comprise any paging indicators for the first group of user equipments.

6. The method of claim 5, wherein the control region is interpretable as a normal control region for the first group of user equipments and as a multimedia broadcast signal frequency network control region for the second group of user equipments when the subframe does not comprise any paging indicators for the first group of user equipments.

7. The method of claim 1, wherein the data region is interpretable by the first group of user equipments as a normal data region and is interpretable by the second group of user equipments as a multimedia broadcast signal frequency network data region.

8. The method of claim 7, wherein the subframe does not comprise any paging indicators for the first group of user equipments.

9. The method of claim 1, wherein the control region and the data region are interpretable as normal subframes by the first group of user equipments and the second group of user equipments when the subframe comprises at least one paging indicator for the first group of user equipments.

10. The method of claim 1, wherein the at least one control region comprises a first control region interpretable by the first group of user equipments and the second group of user equipments.

11. An apparatus for wireless communication, comprising:
means for dynamically configuring one or more subframes, of a radio frame, reserved for paging a first group of one or more legacy user equipments as a special subframe in which transmission of reference signals are limited in a data portion of the special subframe, for at least some radio frames;
means for detecting a page for one of the first group of legacy user equipments to be transmitted in the dynamically configured subframe;
means for generating the dynamically configured subframe with a data region and at least one control region interpretable by the first group of one or more legacy user equipments and by a second group of non-legacy user equipments as a second type, wherein the second group of user equipments supports a plurality of features that are a superset of a plurality of features supported by the first group; and
means for transmitting the subframe to the first group and the second group of user equipments.

12. The apparatus of claim 11, wherein the at least one control region comprises a physical control format indicator channel, a physical hybrid automatic repeat request indicator channel, and a physical control channel.

13. The apparatus of claim 11, wherein the control region is interpretable by the first group of user equipments the same as by the second group of user equipments.

14. The apparatus of claim 13, wherein the control region is interpretable as a normal control region when the subframe does not comprise any paging indicators for the first group of user equipments.

15. The apparatus of claim 11, wherein the control region is interpretable by the first group of user equipments differently from that by the second group of user equipments when the subframe does not comprise any paging indicators for the first group of user equipments.

16. The apparatus of claim 15, wherein the control region is interpretable as a normal control region for the first group of user equipments and as a multimedia broadcast signal frequency network control region for the second group of user equipments when the subframe does not comprise any paging indicators for the first group of user equipments.

17. The apparatus of claim 11, wherein the data region is interpretable by the first group of user equipments as a normal data region and is interpretable by the second group of user equipments as a multimedia broadcast signal frequency network data region.

18. The apparatus of claim 17, wherein the subframe does not comprise any paging indicators for the first group of user equipments.

19. The apparatus of claim 11, wherein the control region and the data region are interpretable as normal subframes by the first group of user equipments and the second group of user equipments when the subframe comprises at least one paging indicator for the first group of user equipments.

20. The apparatus of claim 11, wherein the at least one control region comprises a first control region interpretable by the first group of user equipments and the second group of user equipments.

21. An apparatus for wireless communications, comprising:
at least one processor configured to:
dynamically configure one or more subframes, of a radio frame, reserved for paging a first group of one or more legacy user equipments as a special subframe in which transmission of reference signals are limited in a data portion of the special subframe, for at least some radio frames,
detect a page for one of the first group of legacy user equipments to be transmitted in the dynamically configured subframe,
generate the dynamically configured subframe with a data region and at least one control region interpretable by the first group of one or more legacy user equipments and by a second group of non-legacy user equipments as a second type, wherein the second group of user equipments supports a plurality of features that are a superset of a plurality of features supported by the first group,
transmit the subframe to the first group and the second group of user equipments; and
a memory coupled to the at least one processor.

22. The apparatus of claim 21, wherein the at least one control region comprises a physical control format indicator channel, a physical hybrid automatic repeat request indicator channel, and a physical control channel.

23. The apparatus of claim 21, wherein the control region is interpretable by the first group of user equipments the same as by the second group of user equipments.

24. The apparatus of claim 23, wherein the control region is interpretable as a normal control region when the subframe does not comprise any paging indicators for the first group of user equipments.

25. The apparatus of claim 21, wherein the control region is interpretable by the first group of user equipments differently from that by the second group of user equipments when the subframe does not comprise any paging indicators for the first group of user equipments.

26. The apparatus of claim 25, wherein the control region is interpretable as a normal control region for the first group of user equipments and as a multimedia broadcast signal frequency network control region for the second group of user equipments when the subframe does not comprise any paging indicators for the first group of user equipments.

27. The apparatus of claim 21, wherein the data region is interpretable by the first group of user equipments as a normal data region and is interpretable by the second group of user equipments as a multimedia broadcast signal frequency network data region.

28. The apparatus of claim 27, wherein the subframe does not comprise any paging indicators for the first group of user equipments.

29. The apparatus of claim 21, wherein the control region and the data region are interpretable as normal subframes by the first group of user equipments and the second group of user equipments when the subframe comprises at least one paging indicator for the first group of user equipments.

30. The apparatus of claim 21, wherein the at least one control region comprises a first control region interpretable by the first group of user equipments and the second group of user equipments.

31. A computer-program product for wireless communications, the computer-program product comprising a non-transitory computer-readable medium comprising code for:

dynamically configuring one or more subframes, of a radio frame, reserved for paging a first group of one or more legacy user equipments as a special subframe in which transmission of reference signals are limited in a data portion of the special subframe, for at least some radio frames;

detecting a page for one of the first group of legacy user equipments to be transmitted in the dynamically configured subframe;

generating the dynamically configured subframe with a data region and at least one control region interpretable by the first group of one or more legacy user equipments and by a second group of non-legacy user equipments as a second type, wherein the second group of UEs supports a plurality of features that are a superset of a plurality of features supported by the first group; and transmitting the subframe to the first group and the second group of user equipments.

32. The computer-program product of claim 31, wherein the at least one control region comprises a physical control format indicator channel, a physical control format indicator channel, and a physical control channel.

33. The computer-program product of claim 31, wherein the control region is interpretable by the first group of user equipments the same as by the second group of user equipments.

34. The computer-program product of claim 33, wherein the control region is interpretable as a normal control region when the subframe does not comprise any paging indicators for the first group of user equipments.

35. The computer-program product of claim 31, wherein the control region is interpretable by the first group of user equipments differently from that by the second group of user equipments when the subframe does not comprise any paging indicators for the first group of user equipments.

36. The computer-program product of claim 35, wherein the control region is interpretable as a normal control region for the first group of user equipments and as a multimedia broadcast signal frequency network control region for the second group of user equipments when the subframe does not comprise any paging indicators for the first group of user equipments.

37. The computer-program product of claim 31, wherein the data region is interpretable by the first group of user equipments as a normal data region and is interpretable by the second group of user equipments as a multimedia broadcast signal frequency network data region.

38. The computer-program product of claim 37, wherein the subframe does not comprise any paging indicators for the first group of user equipments.

39. The computer-program product of claim 31, wherein the control region and the data region are interpretable as normal subframes by the first group of user equipments and the second group of user equipments when the subframe comprises at least one paging indicator for the first group of user equipments.

40. The computer-program product of claim 31, wherein the at least one control region comprises a first control region interpretable by the first group of user equipments and the second group of user equipments.

\* \* \* \* \*